(12) United States Patent
Ouzineb et al.

(10) Patent No.: US 10,590,300 B2
(45) Date of Patent: Mar. 17, 2020

(54) COMPOSITION FOR COATING POLYMER FILMS, COATING PROCESS AND COMPOSITE MATERIALS OBTAINED

(71) Applicant: TORAY FILMS EUROPE, Saint Maurice de Beynost (FR)

(72) Inventors: Keltoum Ouzineb, Lyons (FR); Maria Cristina Penache, Chavanoz (FR)

(73) Assignee: TORAY FILMS EUROPE, Saint Maurice de Beynost (FR)

( * ) Notice: Subject to any disclaimer, the term of this patent is extended or adjusted under 35 U.S.C. 154(b) by 23 days.

(21) Appl. No.: 15/103,513

(22) PCT Filed: Dec. 19, 2014

(86) PCT No.: PCT/FR2014/053467
§ 371 (c)(1),
(2) Date: Jun. 10, 2016

(87) PCT Pub. No.: WO2015/092329
PCT Pub. Date: Jun. 25, 2015

(65) Prior Publication Data
US 2016/0312056 A1    Oct. 27, 2016

(30) Foreign Application Priority Data

Dec. 19, 2013  (FR) .................................... 13 63002

(51) Int. Cl.
*C09D 133/10*  (2006.01)
*C08J 7/04*  (2006.01)
(Continued)

(52) U.S. Cl.
CPC .............. *C09D 133/10* (2013.01); *B05D 7/50* (2013.01); *C08J 7/045* (2013.01); *C08J 7/047* (2013.01);
(Continued)

(58) Field of Classification Search
None
See application file for complete search history.

(56) References Cited

U.S. PATENT DOCUMENTS 3,993,612 A * 11/1976 Aihara ................. C08F 220/28
                                                                524/522
4,410,687 A * 10/1983 Schimmel ............. C08G 63/48
                                                                528/295.5
(Continued)

FOREIGN PATENT DOCUMENTS

EP         0 260 203 A1    3/1988
JP        60-170604 A  *   9/1985
(Continued)

OTHER PUBLICATIONS

JP 60-170604 A (Yamazaki et al) (published Sep. 4, 1985)—full English translation (Year: 1985).*
(Continued)

*Primary Examiner* — Vivian Chen
(74) *Attorney, Agent, or Firm* — Oliff PLC (57) ABSTRACT

The invention relates to a composition intended for coating polymer films, making it possible to improve the adhesion between the film and a final coating, and to confer good barrier properties on the coated film. The coating composition comprises at least one acrylic and/or methacrylic polymer which has a gel content of at least 50% by weight, relative to the total weight of acrylic and/or methacryclic polymer, at least one crosslinking agent and at least one polyester comprising sulphonyloxy groups, which is water-soluble or water-dispersible.

20 Claims, 1 Drawing Sheet (51) Int. Cl.
| | |
|---|---|
| C09D 5/02 | (2006.01) |
| B05D 7/00 | (2006.01) |
| C09D 133/08 | (2006.01) |
| B32B 27/08 | (2006.01) |
| B32B 27/28 | (2006.01) |
| B32B 7/04 | (2019.01) |
| B32B 7/10 | (2006.01) |
| B32B 27/30 | (2006.01) |
| B32B 5/00 | (2006.01) |
| B32B 7/12 | (2006.01) |
| B32B 15/082 | (2006.01) |
| B32B 27/18 | (2006.01) |
| B32B 27/36 | (2006.01) |
| C08L 61/26 | (2006.01) |
| C08L 33/08 | (2006.01) |
| C08L 33/04 | (2006.01) |
| C08L 61/28 | (2006.01) |
| C08L 33/10 | (2006.01) |
| C08L 67/02 | (2006.01) |
| C08L 33/06 | (2006.01) |
| C08L 33/12 | (2006.01) |
| C08L 33/02 | (2006.01) |
| C09D 5/00 | (2006.01) |
| C09D 133/02 | (2006.01) |
| C09D 133/06 | (2006.01) |
| C09D 161/26 | (2006.01) |
| C09D 133/12 | (2006.01) |
| C09D 133/04 | (2006.01) |
| C09D 167/02 | (2006.01) |
| C09D 161/28 | (2006.01) |
| C09D 7/20 | (2018.01) |
| C09D 7/65 | (2018.01) |
| C09D 201/02 | (2006.01) |
| B05D 7/24 | (2006.01) |
| B05D 5/10 | (2006.01) |
| B05D 3/02 | (2006.01) |
| B05D 3/00 | (2006.01) |
| B05D 3/12 | (2006.01) |
| B05D 7/04 | (2006.01) |
| B29K 67/00 | (2006.01) |
| B29K 33/00 | (2006.01) |
| B29K 61/20 | (2006.01) |
| C08J 3/24 | (2006.01) |
| C08J 3/26 | (2006.01) |
| C08J 3/05 | (2006.01) |

(52) U.S. Cl.
CPC ........... *C09D 5/024* (2013.01); *C09D 133/08* (2013.01); *B05D 3/00* (2013.01); *B05D 3/002* (2013.01); *B05D 3/02* (2013.01); *B05D 3/12* (2013.01); *B05D 5/10* (2013.01); *B05D 7/04* (2013.01); *B05D 7/24* (2013.01); *B05D 7/52* (2013.01); *B05D 7/56* (2013.01); *B05D 2201/02* (2013.01); *B05D 2401/20* (2013.01); *B05D 2420/01* (2013.01); *B05D 2420/05* (2013.01); *B05D 2502/00* (2013.01); *B05D 2502/005* (2013.01); *B05D 2508/00* (2013.01); *B29K 2033/00* (2013.01); *B29K 2033/08* (2013.01); *B29K 2033/12* (2013.01); *B29K 2061/20* (2013.01); *B29K 2067/00* (2013.01); *B32B 5/00* (2013.01); *B32B 7/04* (2013.01); *B32B 7/10* (2013.01); *B32B 7/12* (2013.01); *B32B 15/082* (2013.01); *B32B 27/08* (2013.01); *B32B 27/18* (2013.01); *B32B 27/28* (2013.01); *B32B 27/30* (2013.01); *B32B 27/308* (2013.01); *B32B 27/36* (2013.01); *B32B 2255/10* (2013.01); *B32B 2255/26* (2013.01); *B32B 2255/28* (2013.01); *B32B 2307/75* (2013.01); *C08J 3/05* (2013.01); *C08J 3/24* (2013.01); *C08J 3/26* (2013.01); *C08J 7/04* (2013.01); *C08J 7/042* (2013.01); *C08J 2367/02* (2013.01); *C08J 2433/02* (2013.01); *C08J 2433/04* (2013.01); *C08J 2433/08* (2013.01); *C08J 2433/10* (2013.01); *C08J 2433/12* (2013.01); *C08L 33/02* (2013.01); *C08L 33/04* (2013.01); *C08L 33/06* (2013.01); *C08L 33/08* (2013.01); *C08L 33/10* (2013.01); *C08L 33/12* (2013.01); *C08L 61/26* (2013.01); *C08L 61/28* (2013.01); *C08L 67/02* (2013.01); *C09D 5/00* (2013.01); *C09D 5/002* (2013.01); *C09D 7/20* (2018.01); *C09D 7/65* (2018.01); *C09D 133/02* (2013.01); *C09D 133/04* (2013.01); *C09D 133/06* (2013.01); *C09D 133/12* (2013.01); *C09D 161/26* (2013.01); *C09D 161/28* (2013.01); *C09D 167/02* (2013.01); *C09D 201/025* (2013.01); *Y02P 20/582* (2015.11); *Y10T 428/31786* (2015.04); *Y10T 428/31794* (2015.04); *Y10T 428/31797* (2015.04)

(56) References Cited

U.S. PATENT DOCUMENTS

| | | | | |
|---|---|---|---|---|
| 4,571,363 | A * | 2/1986 | Culbertson | B44D 3/18 428/332 |
| 4,673,703 | A * | 6/1987 | Bromley | C09D 151/003 524/504 |
| 4,830,918 | A * | 5/1989 | Schinkel | B32B 27/08 428/349 |
| 4,880,700 | A * | 11/1989 | Charmot | C08J 7/047 428/337 |
| 4,925,908 | A * | 5/1990 | Bernard | C08F 220/12 526/320 |
| 4,943,612 | A * | 7/1990 | Morita | C04B 24/26 524/714 |
| 5,218,032 | A * | 6/1993 | Sharma | C08J 3/005 524/379 |
| 5,427,835 | A * | 6/1995 | Morrison | C09K 3/16 428/96 |
| 5,500,457 | A * | 3/1996 | Sarkar | C08F 265/06 523/201 |
| 5,539,073 | A * | 7/1996 | Taylor | C08F 220/40 524/523 |
| 5,540,974 | A * | 7/1996 | Hoseki | H01G 4/20 361/323 |
| 5,581,435 | A * | 12/1996 | Kinoshita | H01G 4/18 361/301.4 |
| 5,763,096 | A * | 6/1998 | Takahashi | C08J 7/04 428/480 |
| 5,985,437 | A * | 11/1999 | Chappell, Jr. | B41M 5/5272 264/289.3 |
| 6,046,253 | A * | 4/2000 | Erdtmann | C09D 11/326 523/160 |
| 6,893,731 | B2 * | 5/2005 | Kausch | C08F 265/04 264/288.4 |
| 10,077,346 | B2 * | 9/2018 | Ouzineb | C09D 5/002 |
| 2002/0127414 | A1 * | 9/2002 | Peiffer | C08J 7/047 428/447 |
| 2003/0064214 | A1 * | 4/2003 | Janssens | B32B 27/30 428/215 |
| 2003/0068511 | A1 * | 4/2003 | Murschall | B32B 27/08 428/480 |
| 2003/0091778 | A1 * | 5/2003 | Lee | C08F 220/18 428/40.1 |
| 2004/0167271 | A1 * | 8/2004 | Maeyama | C09D 121/00 524/513 |

(56) References Cited

U.S. PATENT DOCUMENTS

| | | | |
|---|---|---|---|
| 2005/0014886 A1* | 1/2005 | Yanutola | C09J 7/405 524/503 |
| 2006/0128829 A1* | 6/2006 | Breton | C09D 11/30 523/160 |
| 2007/0031654 A1* | 2/2007 | Posey | B32B 27/08 428/336 |
| 2007/0088120 A1* | 4/2007 | Zecha | C08F 218/18 524/832 |
| 2009/0155474 A1* | 6/2009 | Finley | C09D 133/04 427/389.8 |
| 2010/0081764 A1* | 4/2010 | Ouzineb | C08F 2/22 524/767 |
| 2010/0086683 A1* | 4/2010 | Birau | C09D 11/34 427/256 |
| 2010/0086701 A1* | 4/2010 | Iftime | C09D 11/101 427/511 |
| 2013/0260144 A1* | 10/2013 | Yamazaki | B32B 27/308 428/336 |
| 2015/0344650 A1* | 12/2015 | Ouzineb | C08J 7/04 428/483 |
| 2018/0305572 A1* | 10/2018 | Ouzineb | C08J 3/05 |

FOREIGN PATENT DOCUMENTS

| | | | |
|---|---|---|---|
| JP | 60-170605 A | * | 9/1985 |
| JP | 62-283166 A | * | 12/1987 |
| JP | 63-054401 A | * | 3/1988 |
| JP | 63-264678 A | * | 11/1988 |
| JP | 2000-063406 A | * | 2/2000 |
| JP | 2002-301793 A | * | 10/2002 |
| JP | 2006-028395 A | * | 2/2006 |
| WO | 2007/002322 A1 | | 1/2007 |

OTHER PUBLICATIONS

Mar. 27, 2015 International Search Report issued in International Patent Application No. PCT/FR2014/053467.

* cited by examiner

COMPOSITION FOR COATING POLYMER FILMS, COATING PROCESS AND COMPOSITE MATERIALS OBTAINED

FIELD OF THE INVENTION

The technical field of the invention is that of plastic films, in particular polyester films. More precisely, the invention relates to a composition intended for coating polymer films, making it possible on the one hand to improve the adhesion between the film and a final coating, and on the other hand to endow the coated film with good barrier properties.

TECHNOLOGICAL BACKGROUND

Plastic films and in particular polyester films are well known for their excellent properties in terms of thermal stability, dimensional stability, chemical resistance and relatively high surface energy. They are very strong materials and are particularly in demand as substrates for various coatings. Composite materials comprising a plastic film as substrate and a coating have numerous applications: packaging, and in particular food packaging; protection of substrates; films or sheets for graphic art, for example for printing or drawing; and metallized films.

However, these composite materials have the drawback that they have insufficient adhesion between said substrates, in particular polyester films, and their coatings, thus making their use inefficient and/or unreliable and therefore unsuitable. These problems of adhesion are particularly great when the composite material is subjected to high stresses. For example, in the food sector, packaging may be subjected to conditions of humidity and high temperature in processes for hot filling, pasteurization and sterilization. It is known that in these situations, metallic coatings do not adhere properly to PET film. This lack or loss of adhesion means that the expected barrier effect against oxygen and water vapour is lost, which causes deterioration of the food contents and poses a health risk.

Several solutions have been proposed in the past in an attempt to solve this problem of bonding between the substrate and its coating. Thus, physical treatments (flame treatment, corona discharges, abrasive treatment) or physico-chemical treatments (treatments with acid, grafting of chemical functions) on the surface of the films have been tested. As these various treatments have many drawbacks, application of an intermediate coating was preferred.

This intermediate coating, also commonly called priming coat, is designed to have on the one hand good adhesion to the substrate and on the other hand good adhesion to the coating. Numerous polymers or copolymers have been proposed for producing this coating. U.S. Pat. Nos. 2,794,742, 2,627,088 and FR 1 428 831 state that the polymers that are most suitable as bonding primer are acrylic polymers. This priming coat is applied to the substrate by coating with organic solutions or aqueous emulsions. One drawback of the use of these acrylic polymers is the fact that the formulation of the acrylic-based coating must be adapted to each type of final coating and therefore to each use of the coated film to have the best possible adhesion. This means that the manufacturer needs to have a panel of various solutions. Therefore a coating has been sought that improves the adhesion of the final coating to its substrate which is as universal as possible, thus making it possible to omit the step of adapting the coating composition to each final coating. Patent application EP 0 260 203 proposes a solution to this problem. This patent application describes a modified polymer obtained by aqueous-phase radical polymerization of at least one monomer of an acrylic nature in the presence of an effective quantity of a water-dispersible polyester, derived from at least one aromatic dicarboxylic acid and at least one aliphatic diol and comprising a plurality of sulphonyloxy groups. Although the results for adhesion obtained with this formulation are good, further improvement is desirable.

Moreover, it is also desirable for the composite material to have good barrier properties to oxygen and water vapour. Although maintenance of the barrier properties of the material over time is generally linked to the adhesion between the substrate and the coating on the material, the initial quality of the barrier effect of the material is an independent property. One route used conventionally for improving the barrier effect of the material consists of increasing the degree of cross-linking in the composition of the priming coat. However, this technical solution has limited effects: it was found that when the concentration of cross-linking agent was increased, the level of the barrier effect quickly reached a plateau, the value of which remained insufficient relative to the requirements.

In this context, one of the objectives of the present invention is to propose novel coating compositions for polymer films, and in particular for polyester films, which, when used as priming coat between a polymer film and a coating, are capable of endowing the composite material obtained with improved barrier properties. In addition, it is desirable for these composite materials to have, advantageously, properties of adhesion that are as good or even better than in the prior art, and for these properties of adhesion to be maintained at high temperature and under moist conditions, in particular for this composite material to be insensitive to water. Moreover, another objective is that the coating composition should be as universal as possible.

BRIEF DESCRIPTION OF THE INVENTION

The inventors discovered that these objectives could be achieved with a novel coating composition containing a particular additive.

According to a first aspect, the invention relates to a coating composition comprising:
- at least one acrylic and/or methacrylic polymer having a gel content of at least 50% by weight, relative to the total weight of acrylic and/or methacrylic polymer;
- at least one cross-linking agent;
- at least one water-soluble or water-dispersible polyester with sulphonyloxy groups.

The present invention also relates to a process for coating a substrate with at least one layer of bonding primer, characterized in that the following steps are implemented:
a) a substrate is employed;
b) optionally, a physical surface treatment of said substrate is carried out;
c) at least one face of said substrate is coated with the coating composition as described above; and
d) the coating is cross-linked in order to obtain a priming coat, the residual level of free acid functions at the surface of the priming coat being at least 5% by weight, relative to the total weight of polymer contained in the priming coat.

According to another of its aspects, the present invention relates to a preparation process of a composite material comprising the step consisting of applying a coating capable of reacting with the priming coat on a substrate coated with a priming coat as described above.

Finally, the invention relates to the composite material obtained or obtainable by this process, as well as an article selected from the group constituted by food and non-food packaging, films or sheets for graphic art, films or sheets for decoration, films or sheets for substrate protection and films or sheets for thermal insulation and protection against moisture in the building sector, comprising said composite material.

DETAILED DESCRIPTION OF THE INVENTION

It is to be understood that, in the context of this description, the term "comprised between" must be interpreted as including the limits indicated.

The coating composition according to the invention comprises:
- at least one acrylic and/or methacrylic polymer having a gel content of at least 50% by weight, relative to the total weight of acrylic and/or methacrylic polymer;
- at least one cross-linking agent;
- at least one water-soluble or water-dispersible polyester with sulphonyloxy groups.

This coating composition is preferably in the form of an aqueous dispersion.

The acrylic and/or methacrylic polymer according to the invention comprises acrylic and/or methacrylic monomers. It is constituted by monomers that may be of different types: hydrophobic monomers, hydrophilic monomers and partially hydrophilic monomers. Preferably, the acrylic and/or methacrylic polymer according to the invention comprises:
  i. at least one partially hydrophilic monomer of alkyl acrylate, of alkyl methacrylate or a mixture of the two, the alkyl moiety of these monomers containing 1 or 2 carbon atoms;
  ii. optionally at least one hydrophobic monomer of alkyl acrylate, of alkyl methacrylate or a mixture of the two, the alkyl moiety of these monomers being linear or branched and containing at least 4 carbon atoms;
  iii. at least one hydrophilic monomer.

The partially hydrophilic monomers that may be used for the present invention include the alkyl acrylates or the alkyl methacrylates where the alkyl moiety has 1 or 2 carbon atoms. The partially hydrophilic monomers preferred are methyl acrylate, methyl methacrylate, ethyl acrylate, and mixtures thereof, methyl methacrylate and ethyl acrylate being the most preferred.

The quantity of partially hydrophilic monomers based on the total weight of monomer is preferably at least 5% by weight, more preferably at least 30% by weight, more preferably comprised between 40 and 60% by weight, and even more preferably comprised between 50 and 60% by weight.

The hydrophobic monomers that may be used for the present invention include the alkyl acrylates or the alkyl methacrylates where the alkyl moiety is linear or branched and contains at least 4 carbon atoms. The alkyl moiety may be selected from the group constituted by n-butyl, isobutyl, t-butyl, n-pentyl, n-hexyl, ethyl-2-hexyl, decyl, dodecyl, and octadecyl. The preferred hydrophobic monomers are butyl acrylate, butyl methacrylate and mixtures thereof.

The quantity of hydrophobic monomers based on the total weight of monomer is preferably at least 5% by weight, more preferably at least 10% by weight.

The hydrophilic monomers that may be used in the present invention are monomers that are copolymerizable with the alkyl acrylate or alkyl methacrylate monomers and that are water-soluble. The hydrophilic monomers may be selected from the mono-olefinic monocarboxylic acids, the mono-olefinic dicarboxylic acids and mixtures thereof. Examples of hydrophilic monomers include, but are not limited to, acrylic acid, methacrylic acid, fumaric acid, maleic acid, itaconic acid, crotonic acid, an oligomer of acrylic acid and mixtures thereof. The acids preferred are acrylic acid, methacrylic acid and mixtures thereof.

The quantity of hydrophilic monomers based on the total weight of monomers is at least 5% by weight, preferably at least 10% by weight.

The total weight of hydrophobic, hydrophilic and partially hydrophilic monomers described above preferably represents at least 60%, more preferably at least 75%, more preferably at least 80%, and even more preferably at least 90% of the total weight of the monomers constituting the acrylic and/or methacrylic polymer according to the invention. The percentage by weight of monomers different from these hydrophobic, hydrophilic and partially hydrophilic monomers is preferably less than 20%, more preferably less than 10%, and even more preferably less than 5%, relative to the total weight of the monomers. Preferably, the acrylic and/or methacrylic polymer according to the invention is constituted by or essentially constituted by the hydrophobic, hydrophilic and partially hydrophilic monomers described above.

Advantageously, the acrylic and/or methacrylic polymer according to the invention need not contain monomers incompatible with food applications, for example monomers selected from the group constituted by the monomers of the acrylamide type, of the aromatic dicarboxylic acid type or an ester thereof (in particular phthalic, isophthalic and terephthalic acid and the corresponding esters), of the styrene type, alkylphenol type or butadiene type.

Preferably, the acrylic and/or methacrylic polymer according to the invention comprises:
  i. at least 30% of partially hydrophilic monomer(s) selected from methyl acrylate, methyl methacrylate, ethyl acrylate, and mixtures thereof.
  ii. optionally at least one hydrophobic monomer of alkyl acrylate, of alkyl methacrylate or a mixture of the two, the alkyl moiety of these monomers being linear or branched and containing at least 4 carbon atoms;
  iii. at least 10% of hydrophilic monomer(s) selected from acrylic acid, methacrylic acid and mixtures thereof;

The acrylic and/or methacrylic polymer according to the invention is preferably in the form of polymer particles. These particles may be dispersed in the aqueous phase. Preferably, the polymer particles are small: the average diameter of the particles may be less than 100 nm. As a result, the surface area of the polymer particles is very large.

According to the present invention, the acrylic and/or methacrylic polymer has a gel content of at least 50% by weight, relative to the total weight of acrylic and/or methacrylic polymer. The gel content of a polymer represents the proportion of insoluble matter in the polymer, and it can therefore characterize the level of cross-linking of the polymer. The gel content of the particles of acrylic and/or methacrylic polymers is measured using a Soxhlet extractor by the following technique:

1 g of acrylic and/or methacrylic polymer is put in a previously weighed cellulose capsule. A flask is filled with 100 ml of tetrahydrofuran (THF) solvent and left to stand under a nitrogen atmosphere. The system is heated to 95° C. using an oil bath. At 95° C., the nitrogen flow is decreased and aluminium foil is placed around the glass column to keep it hot and prevent condensation of THF on the walls. Extraction starts when the THF evaporates and when it drops in the capsule, dissolving the acrylic and/or methacrylic polymer that has not been cross-linked. Extraction takes 7 hours. Then the capsule is dried at 105° C. overnight.

The gel content (G) is calculated using the following equation:

$$G\ (\%) = [(Wf - Wc) \times 100] / Wi$$

in which:
Wf is the final weight, i.e. after drying, of the capsule and of the insoluble polymer,
Wc is the weight of the capsule, and
Wi is the weight of the dried polymer.

For simplicity and by convention, acrylic and/or methacrylic polymer having a gel content of at least 50% by weight relative to the total weight of acrylic and/or methacrylic polymer, or an aqueous dispersion thereof, may be denoted by the term "latex".

In the present invention, the coating composition further comprises at least one cross-linking agent. By cross-linking agent is meant an additive that is added to the acrylic and/or methacrylic polymer and that generates a cross-linking reaction between the polymer chains, in particular owing to the hydroxy and carboxyl functions of the acrylic and/or methacrylic polymer. This cross-linking thus generates the formation of one or more three-dimensional networks. As the acrylic and/or methacrylic polymer according to the invention is already highly cross-linked, the cross-linking agent that is added is not intended to provide intramolecular cross-linking. The inventors think that this cross-linking agent will allow interfacial cross-linking of the polymer in the form of particles, and will be used in particular as an agent for polarizing the surface of the film formed by the acrylic and/or methacrylic particles.

The cross-linking agents known to a person skilled in the art may be suitable for implementing the present invention. The cross-linking agents may be amine-based resins, in particular melamine-aldehydes, benzoguanamine-aldehyde or derivatives thereof. The amine-based resins are complex mixtures, having various functional sites, and they are synthesized conventionally by the condensation of formaldehyde with an amine and subsequent alkylation of the resultant methylol groups with an alcohol.

Certain cross-linking agents used are melamine-aldehyde resins of formula (I) or benzoguanamine-aldehyde resins of formula (II):

(I)

(II)

where the $R_1$ to $R_6$ groups are selected independently of one another from —H, —$CH_2OH$ and —$CH_2OR_7$, $R_7$ being a $C_1$ to $C_5$ alkyl group.

The amine-based resins preferably used in the present invention are Cymel 1123® (a methylated and ethylated resin of benzoguanamine-formaldehyde, 98% minimum solids) and Cymel 303LF® (a methylated resin of melamine-formaldehyde having reactive alkoxy groups, 98% minimum solids), of which the respective chemical structures are given below:

Cymel 1123

Cymel 303

(in which R may be $CH_3$ or $C_2H_5$)

These resins are marketed by Cytec Industries Inc.
The best performances are obtained with:
cross-linking agents selected from the amine-based resins, partially methylated or better still highly methylated, and/or
cross-linking agents allowing rapid curing at a temperature greater than 80° C., and/or
cross-linking agents having long-term storage stability, preferably greater than 48 hours, after it is mixed with the acrylic polymer in an aqueous medium.

The functional groups of the cross-linking agent and the carboxyl, hydroxy, amide and/or methylol groups available on the acrylic and/or methacrylic polymers may react in the presence of an acid catalyst. The acid catalyst may or may not be blocked. As acid catalyst suitable for the present invention, there may be mentioned, without being limited to these: mineral acids, p-toluenesulphonic acid, dinonylnaphthalene disulphonic acid, dodecylbenzenesulphonic acid, oxalic acid, maleic acid, hexamic acid, phosphoric acid, phthalic acid, acrylic acid copolymerized in the polymer. The catalyst most commonly used is para-toluenesulphonic acid. The optimum quantity of catalyst is a function of the targeted acidity of the acrylic and/or methacrylic polymer and the curing temperature.

These cross-linking agents generally show good reactivity starting from a temperature greater than 140° C. The cross-linking agents of the melamine-formol type conventionally have a minimum activation temperature greater than 100° C., which is suitable for the process according to the invention and also corresponds to the drying temperature of the polymer by evaporation of the water and therefore to the formation of the cross-linked coating.

In the coating composition according to the invention, the proportions by weight (weight/weight) of acrylic and/or methacrylic polymer relative to the cross-linking agent are preferably comprised between 95/5 and 70/30, more preferably comprised between 90/10 and 75/25, and even more preferably comprised between 85/15 and 80/20.

Moreover, the coating composition according to the invention comprises at least one water-soluble or water-dispersible polyester with sulphonyloxy groups. By "water-dispersible polymer" is meant, in the present invention, a polymer forming stable homogeneous dispersions with water.

The sulphonyloxy groups are defined as the groups of general formula in which n has a value of 1 or 2 and M represents an alkali metal ion, an alkaline earth ion or a quaternary ammonium.

The polyester with sulphonyloxy groups may be obtained by the polycondensation of one or more aromatic dicarboxylic acids with one or more aliphatic diols and at least one bifunctional compound comprising at least one sulphonyloxy group.

Among the aromatic dicarboxylic acids that may be used, there may be mentioned terephthalic acid, isophthalic acid, phthalic acid, naphthalene-1,4-dicarboxylic acid, oxy-4,4'-dibenzoic acid, bis(hydroxycarbonyl-4-phenyl)sulphone and dihydroxycarbonyl-4,4'-benzophenone. These acids may be used alone or mixed. The aromatic dicarboxylic acid is preferably selected from terephthalic acid, isophthalic acid and mixtures thereof. Aliphatic dicarboxylic acids comprising from 3 to 15 carbon atoms may be combined with the aromatic dicarboxylic acids, for example adipic acid, suberic acid, sebacic acid, succinic acid and dodecanedioic acid.

Among the diols that may be used, there may be mentioned ethylene glycol, butane-1,4-diol, butane-1,3-diol, propane-1,3-diol, propane-1,2-diol, 2,2-dimethylpropane-1,3-diol (or neopentylglycol), pentane-1,5-diol, hexane-1,6-diol, cyclohexanedimethanol, diethylene glycol, triethylene glycol, tetraethylene glycol, pentamethylene glycol, hexamethylene glycol or decamethylene glycol. Preferably, the diol is selected from ethylene glycol and oligomers thereof, alone or mixed with one another and/or with other diols. The oligomers of ethylene glycol are represented by the formula HO—($CH_2$—$CH_2$—O—)$_n$H, in which n is an integer comprised between 2 and 10.

Finally, the bifunctional compound comprising at least one sulphonyloxy group may be selected from the compounds comprising at least one sulphonyloxy group as defined above and comprising at least two functional groups capable of reacting with the diacids and/or the diols by polycondensation. For example the alkali metal salts of aromatic dicarboxylic acids with sulphonyloxy groups such as those of the sulphoterephthalic, sulphoisophthalic, sulphophthalic, 4-hydroxysulphonyl-naphthalene-2,7-dicarboxylic acids or their derivatives and in particular their esters may be mentioned.

For example, a water-soluble or water-dispersible polyester with sulphonyloxy groups according to the invention may correspond to the following chemical formula:

in which X has a value of 20.

Water-soluble or water-dispersible polyesters with sulphonyloxy groups have been described in the prior art, for example in patent application EP 0 260 203. Moreover, polyesters that may be used in the present invention are available commercially.

In the coating composition according to the invention, the content of water-soluble or water-dispersible polyester with sulphonyloxy groups is preferably comprised between 2 and 30% by weight, more preferably comprised between 5 and 20% by weight, and even more preferably comprised between 8 and 12% by weight dry, relative to the dry weight of acrylic and/or methacrylic polymer.

In a variant of the present invention, the coating composition may additionally contain additives, in particular mineral fillers or organic or inorganic particles dispersed in water, which will have the aim of controlling the sliding of the substrate after coating. However, preferably, the coating according to the invention does not contain an adhesion promoter, for example citrates, adipates or epoxidized vegetable oils.

The coating composition may be obtained by mixing the compounds, preferably in water. The composition is then in the form of an aqueous dispersion. The dry extract of the composition may be comprised between 5 and 40% by weight, preferably comprised between 10 and 30% by weight, relative to the total weight of the composition.

The inventors discovered that the coating composition as described above was particularly useful, in that it can be used as a priming coat between a polymer film and a coating, and that, quite unexpectedly, it endows the composite material obtained not only with properties of adhesion as good, or even better than in the prior art, but also with improved barrier properties.

The present invention also relates to a process for coating a substrate with at least one layer of bonding primer.

The substrate for the coating process is a solid substrate, preferably flexible. It may in particular be a polymer film. Quite particularly, a polyester film is used. The polyester is a product of the polycondensation of one or more aromatic dicarboxylic acids (terephthalic acid, isophthalic acid, for example) or of their derivatives (halides, esters) with at least one alkylene glycol (ethylene glycol; propane-1,3-diol; butane-1,4-diol for example). Preferably, they are polyesters derived from terephthalic acid or from a mixture of terephthalic acid and another aromatic dicarboxylic acid (isophthalic acid for example), the terephthalic acid content of the mixture being sufficient so that the polymer is essentially crystalline after stretching.

Preferably, film-forming linear polyesters, crystallizable by orientation and obtained in the usual way starting from one or more aromatic dicarboxylic acids or derivatives thereof (esters of lower aliphatic alcohols or halides for example) and one or more aliphatic diols (glycols), are used in the present invention.

The polyester constituting the base film may be selected from the polyesters that are usually employed for obtaining biaxially stretched semicrystalline films. By way of examples of aromatic acids, phthalic, terephthalic, isophthalic, naphthalene-2,5-dicarboxylic, and naphthalene-2,6-dicarboxylic acids may be mentioned. These acids may be combined with a minor quantity of one or more aliphatic or cycloaliphatic dicarboxylic acids, such as adipic, azelaic, tetra- or hexahydroterephthalic acids. By way of non-limitative examples of aliphatic diols, there may be mentioned ethylene glycol, propane-1,3-diol and butane-1,4-diol. These diols may be combined with a minor quantity of one or more aliphatic diols that are more condensed with respect to carbon (neopentylglycol for example) or cycloaliphatic diols (cyclohexanedimethanol for example).

Preferably, the crystallizable film-forming polyesters are alkylenediol polyterephthalates or polynaphthalenedicarboxylates and, in particular, polyethylene terephthalate (PET) or poly(butane-1,4-diol terephthalate) or copolyesters comprising at least 80 mol % of ethylene glycol terephthalate units. Advantageously, the polyester is a polyethylene terephthalate of which the intrinsic viscosity measured at 25° C. in ortho-chlorophenol is comprised between 0.6 dl/g and 0.75 dl/g.

The biaxially stretched polyester films are, for example:
either constituted by polyethylene terephthalate;
or constituted by polyethylene terephthalate copolyesters containing cyclohexyl dimethylol units in place of the ethylene units, alone or mixed;
or composed of polyethylene terephthalate copolyesters with a polyester moiety with isophthalate units, alone or mixed;
or constituted by several layers of polyesters with different chemical natures, as described above, obtained by coextrusion.

Specific examples of aromatic polyesters are in particular polyethylene terephthalate (PET), polyethylene isophthalate, polybutylene terephthalate, poly(dimethyl-1,4-cyclohexyleneterephthalate) and polyethylene-2,6-naphthalenedicarboxylate. The aromatic polyester may be a copolymer of these polymers or a mixture of these polymers with a small quantity of other resins, for example, without being limitative, polybutylene terephthalate (PBT). Among these polyesters, polyethylene terephthalate (PET) and polyethylene-2,6-naphthalenedicarboxylate (PEN) are particularly preferred as they offer a good balance between physical properties, mechanical properties and optical properties. Preferably, the content of terephthalic acid, expressed in moles per hundred moles of acid, is at least 80. In the preferred embodiments of the invention, the substrate is a film of polyethylene terephthalate PET (for example biaxially stretched) or polyethylene naphthalate (PEN) or polybutylene terephthalate (PBT).

The substrate films utilized in the present invention may be stretched or unstretched. Preferably, they are stretched. Advantageously, the polyester film employed is biaxially stretched.

The substrate according to the invention may be single-layer, double-layer or triple-layer. Each of the layers is composed of polyesters as defined above, preferably PET, PBT or PEN, and/or of the copolyesters described above and/or of mixtures of polyesters/copolyesters. The layer or layers may have a structure M, MN, MNM or MNO where M is different from N and O, N is different from O. The main layer may be sandwiched between one or two layers, which may or may not be identical in terms of thickness and/or composition. In this structure, the substrate may be symmetric or asymmetric. One of these layers of the substrate may increase the adhesion of the future coating described below.

The substrate utilized for the present invention is preferably a polyester film, more preferably a film of polyethylene terephthalate (PET), the thickness of which is preferably less than or equal to 150 µm (micrometres), more preferably comprised between 4 µm and 100 µm, more preferably comprised between 4 µm and 40 µm, and even more preferably comprised between 4 µm and 12 µm.

The substrate according to the invention may advantageously partly comprise the recycled product obtained from the substrate itself and/or from the coated substrate and/or from the coated and primed substrate. The substrate may contain up to 80% by weight of this recycled product relative to the total weight of final substrate. This makes it possible to reduce the costs of production of the film and avoid economic losses due to non-use of the scraps of substrate, of coated substrate and/or of coated and primed substrate.

The coating process according to the invention comprises a first step (a) consisting of implementing a substrate as described above.

For further improvement of the properties of adhesion of the coating on the coated substrate, the coating process may comprise an optional step (b) consisting of carrying out a physical surface treatment of said substrate. This treatment is carried out before coating (step c). Part or the whole of the surface of the substrate may be treated. The physical treatment may be selected from a treatment by an electric discharge of the corona type and a treatment of the plasma type. Said treatment of the corona type is a corona discharge under ambient air at atmospheric pressure or under gas at elevated partial pressures, preferably comprised between 100 mbar and 3000 mbar, even more preferably at atmospheric pressure.

In order to obtain increased adhesion between the coating and the substrate under wet and dry conditions, a chemical treatment may also be applied to the substrate before the coating step. A physical treatment may or may not be applied prior to the chemical treatment. This chemical treatment is coating with at least one layer of bonding primer or adhesion primer.

Step (c) of the process according to the invention consists of coating at least one face of said substrate with the coating composition as described above. This coating step is followed by a step (d) consisting of cross-linking the coating in order to obtain a priming coat.

Deposition of the coating composition on the substrate, preferably on a polyester film, may be carried out by the various techniques known to a person skilled in the art. Thus, the composition may be deposited by gravity from a slot-orifice coater, or by passing the film through the dispersion, by means of transfer rolls, by coating in line with a reverse etching process.

According to a preferred embodiment of the invention, coating of the substrate is carried out in line, which not only allows simplification of industrial implementation but also a considerable saving of time and money.

The thickness of the coating is selected as a function of the cross-linking kinetics of the latter. It depends in particular on the quantity of coating deposited, the dry extract of the composition used, the percentage of cross-linking agent included in the dispersion and the conditions of drying of the coating.

The substrate is coated on at least one face of the substrate. This may of course be carried out on both faces of the substrate.

The substrate is preferably a stretchable film. Preferably, it is subjected to stretching in one or two perpendicular directions. When it is stretched in both directions, this is called two-dimensional stretching, which may be longitudinal first (Longitudinal Stretching LS, degree of LS≥3.0) followed by transverse stretching (Transverse Stretching TS, degree of TS≥3.5). The degree of planar stretching (defined as the product of the degree of longitudinal stretching and the degree of transverse stretching, regardless of the order of these stretching operations) is for example comprised between 1 and 20, usually greater than 12. The stretching sequences may be different depending on the machines used, without affecting the properties obtained thanks to the invention. For example, machines with so-called reverse sequence or multistep machines, machines with alternating sequences or machines for simultaneous stretching, etc. may usefully be used. The stretching temperature is for example between the glass transition temperature Tg of the substrate and a temperature at most equal to Tg+60° C. in the longitudinal direction as well as in the transverse direction. Longitudinal stretching is carried out for example from 3 to 6 times and transverse stretching for example from 3 to 5 times.

In general, at the end of the stretching operation or operations, the film undergoes a thermal fixing step. By way of example, for PET, thermal fixing is carried out between 180° C. and 250° C. (for example at 240° C.) for 1 to 60 seconds for example and then at a lower temperature in order to stabilize the film.

The step of coating deposition of the coating composition may take place before any stretching of the substrate, between the two steps of stretching of the substrate or after the two steps of stretching, the latter option being less satisfactory. According to a preferred embodiment of the process according to the invention, step (c) of deposition of the coating composition is carried out between the two stretching steps. The coating process according to the invention may therefore further comprise two steps of perpendicular stretching of the substrate, at least one step of which is carried out before or after steps (b) or (c), in order to obtain two-dimensional final stretching.

After deposition of the coating, cross-linking takes place to form a priming coat. Cross-linking takes place after deposition of the coating and is caused by drying of the coating, intended to remove water from the aqueous dispersion. In the case of coating in line, it is not generally necessary to employ a specific drying step: drying is carried out during the steps of stretching and/or thermal fixing. However, it is also possible in the present invention to implement a step of drying by thermal treatment prior to stretching and/or thermal fixing.

At the end of the cross-linking step (d), a priming coat is obtained, the residual level of free acid functions at the surface of the priming coat being at least 5% by weight, relative to the total weight of polymer contained in the priming coat.

These free acid functions originate from the acrylic and/or methacrylic polymer contained in the coating composition. The residual level of free acid functions at the surface can be calculated with the following method of conductometric determination:

The main aim of conductometric determination is to evaluate the quantity of free acid functions available on the acrylic and/or methacrylic polymer. Two types of charge should be distinguished: "strong acid" charges and "weak acid" charges. The "strong acid" charges are in particular sulphate charges $SO_4^{2-}$. The "weak acid" charges are the carboxyl charges $COO^-$ supplied by acrylic and/or methacrylic acid. Conductometric determination is carried out on a previously washed latex the solids content of which is known precisely. The crude latex is diluted to reach a solids content below 5%. This diluted latex is then washed on mixed ion exchange resins, i.e. anionic and cationic. At the end of this step, the counter-ions of the positive charges are hydroxy ions and those of the negative charges are protons. This treatment makes it possible to remove the ionic species that are not grafted to the surface of the particles (charges derived from the initiator or molecules of surfactant, free or weakly adsorbed on the surface of the particles). Determination consists of finding the minima for neutralization of the acid functions using a conductometric probe, and takes place in two steps. The first step consists of determining the strong acid charges ($SO_4^{2-}$) by adding a solution of sodium hydroxide. Once neutralization of these charges has ended, an excess of sodium hydroxide is added, in order to convert the carboxylic acid functions present on the surface to carboxylate ions. The carboxyl charges are not in fact directly detectable with sodium hydroxide, owing to their low $pK_A$. The second step then consists of determining the latex by back titration with hydrochloric acid: the hydroxy ions $OH^-$ in excess are neutralized first, then the weak acid charges $COO^-$. The diluted latex is brought into contact with the resin and stirred for 30 to 40 minutes. It is then filtered on quartz wool to remove the resin, and its conductivity is measured. The operation is repeated as many times as necessary, until the conductivity is constant. The successive washing operations are in fact accompanied by a decrease in conductivity, and washing is considered to have ended when the conductivity stabilizes. The solids content of the washed latex is then determined accurately, as the successive washing operations tend to dilute the latex. In addition, the granulometry of the washed latex is verified, in order to ensure that it has not changed during the washing operations. A certain quantity of latex is weighed accurately and diluted in 50 mL of demineralized water. The whole is stirred and degassed for 10 minutes with a nitrogen stream, in order to remove any trace of carbon dioxide dissolved in the water, which could distort the determination by causing the release of carboxylic functions. Nitrogen flushing is also maintained during the determinations. A preliminary determination makes it possible to evaluate the quantity of latex to use, taking into account the concentration of the titrating solutions (i.e. ~$10^{-2}$ mol·$L^{-1}$), in order to obtain greater accuracy. Three determinations are then carried out to ensure reliability of the results. The determinations are monitored with a conductivity meter equipped with a platinum electrode and connected to an acquisition unit. The concentration of the charges in the latex can then be calculated from the determination curves, using the following equations:

$$C_{strong\ acid\ charges} = \frac{[NaOH] \times V_{NaOH}}{m_{later} \times TS} \times 10^3$$

-continued $$C_{weak\ acid\ charges} = \frac{[HCl] \times V_{HCl}}{m_{later} \times TS} \times 10^3$$

in which:
$C_{charges}$ denotes the concentration of the charges in the latex, expressed in microequivalents per gram of polymer (μeq/gpolymer),
[NaOH] and [HCl] represent respectively the concentration of sodium hydroxide and of hydrochloric acid in the titrating solutions, expressed in mol·L$^{-1}$,
$V_{NaOH}$ and $V_{HCl}$ represent respectively the volume of titrating solutions of sodium hydroxide and of hydrochloric acid used for the determination, expressed in litres,
$m_{latex}$ represents the weight of latex, expressed in grams, and
TS represents the solids content in the diluted latex.

Knowing the acid level in the latex prior to cross-linking, it is possible to deduce by calculation the residual level of free acid functions at the surface of the priming coat by taking into account the number of reactive functions available on the cross-linking agent.

The coating process is such that the priming coat obtained on the substrate has a thickness E that is preferably less than or equal to 200 nm (nanometres), more preferably comprised between 40 nm and 120 nm, more preferably comprised between 50 nm and 100 nm, and even more preferably comprised between 60 nm and 90 nm. The optimum thickness of the priming coat is about 80 nm±20 nm, which corresponds to 0.08 g/m$^2$ of substrate.

The thickness of the coating may in particular vary with:
the solids content of the coating composition, and/or
the method of application and the size of the rolls used for applying the coating composition to the substrate.

The thickness of the priming coat or of the substrate coated with the priming coat can be measured by the TOF-SIMS (Time of Flight-Secondary Ion Mass Spectrometry) method, where 2 types of measurements were carried out.

1. A qualitative depthwise distribution profile from the surface to the core of the substrate under different conditions. This makes it possible to determine the thickness of the priming coat as a function of the erosion time and perform a comparative analysis between different films of the same kind.
2. Measurement of film thickness by profilometry of a pit obtained on a reference substrate (stopping ionic erosion after removal of the coating), and calculation of the rate of erosion from the corresponding erosion time for removing it.

Based on measurement No. 2, a correlation can be established between erosion time/rate of erosion and the thickness. Thus, the thickness can be estimated on all of the substrates for which an erosion time has been measured (measurement No. 1).

The surface area analysed is 100 μm×100 μm at the centre of the erosion pit of larger size (approximately 600 μm×600 μm), to minimize the edge effects and the effects of redeposition. Each point on the profiles is obtained from a mass spectrum, which allows elemental analysis throughout the depth probed. Thus, each element or contaminant present at the surface, at the core of the layers and at the interfaces is detected automatically. The following major elements are detected both in the substrate and in the priming coat: carbon (C) and oxygen (O). Traces of sulphur (S) are detected in the priming coat. The ionic species adopted for the depthwise distribution profiles are therefore the following elements: C, O, and S.

Figure 2:
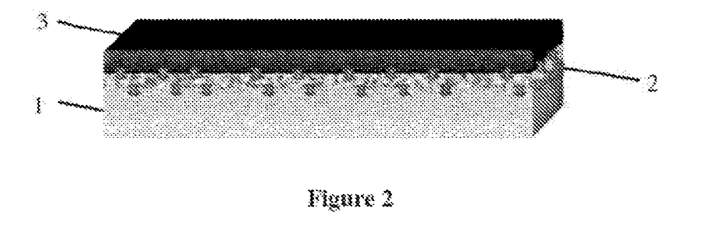
FIG. 2 shows a composite material obtained according to the present invention.

The coated substrate obtained is intended to receive a given coating depending on the desired applications. The coated substrate ready for coating is a composite material. The invention relates to a preparation process of a composite material, as well as the composite material thus obtained. Here, by "composite material" is meant the substrate as described above, with or without physical treatment of the corona or plasma type, which has been coated with a priming coat according to the invention, and has then had a coating applied as defined above. A composite material according to the invention is shown in FIG. 2: it comprises a substrate 1, a coating 3 and a priming coat 2 between the substrate 1 and the coating 3.

In order to obtain this composite material, a coating capable of reacting with the priming coat may be applied on the substrate coated with the priming coat according to the invention. However, without wishing to be bound by this theory, the inventors think that the reaction between the coating and the priming coat takes place via the free acid functions of the polymer or polarity remaining at the surface of the coated substrate. The presence of this polarity (COOH groups, or even OH) allows interaction between the priming coat and the coating and induces better fixation of the latter to the substrate.

The coating may be selected from:
at least one layer of at least one metal and/or at least one metal oxide,
at least one layer of ink, and
at least one layer of adhesive.

Very preferably, the coating consists of at least one layer of at least one metal, especially of aluminium.

In certain cases, it may be envisaged to combine these different types of coatings.

When the coating consists of a layer of at least one metal and/or at least one metal oxide, the metal used for the coating may be selected from aluminium, copper, nickel, silver, gold, and alloys thereof, and the metal oxide(s) may be selected from the oxides of aluminium, of silicon, of copper, of nickel, of silver and mixtures thereof. It may also be envisaged to coat the coated substrate with zinc sulphide.

The ink used for the coating is conventional and is known to a person skilled in the art. It may be selected from various types of inks, with particular features depending on their manner of drying (absorption, oxidative polymerization, solvent evaporation, polymerization under UV radiation). The methods of printing commonly used for plastic films are gravure printing, flexography and offset.

The adhesive used for the coating may be selected from the conventional adhesives known to a person skilled in the art. In particular, commercial products with applications identical to those intended in the present invention are used.

The coating may be applied on the priming coat that is present on one or both faces of the substrate.

Application of the coating may consist of metallizing, preferably vacuum metallizing. It consists of vaporizing a thin layer of metal on the film under vacuum, for example at a pressure of about 4×10$^{-4}$ mbar. Typically, evaporation is carried out in a ceramic crucible heated by the Joule effect at about 1400° C. to 1500° C. The metal is then sprayed onto the surface to be coated, which is in contact with a cooled roll, called a coating roll. The metal then condenses immediately, thus forming a thin layer from 20 nm to 100 nm. During metallizing, the thickness of the layer of metal is monitored by measuring the optical density (OD, a measure of the transparency of the film).

Metallizing may be performed either with at least one metal selected from aluminium, copper, nickel, silver, gold, and alloys thereof, or with at least one metal oxide selected from the oxides of aluminium, silicon, copper, nickel and silver, or with a mixture thereof.

In the case of an ink and adhesive coating, this is applied by the methods known to a person skilled in the art, in particular printing/complexing.

It was discovered that, surprisingly, the composite material according to the invention had both good properties of adhesion between the substrate and the coating, but also very good barrier properties, in particular to oxygen and water vapour. These good properties are advantageously maintained under conditions of high temperature and humidity.

It was found that the composite material had enhanced barrier properties, in particular barrier properties to oxygen. Owing to the addition of polyester bearing sulphonyloxy groups to the priming coat, the composite material's barrier property to oxygen surprisingly reached significantly low levels. The composite material may advantageously have an oxygen transmission rate at 23° C. and 50% humidity less than 1 cc/m$^2$/d, preferably less than 0.5 mg/m$^2$/d. Moreover, it may advantageously have a rate of transmission of water vapour at 38° C. and 90% humidity at least less than 2 mg/m$^2$/d, preferably less than 1 mg/m$^2$/d. In general, the composite material may advantageously have a rate of transmission of oxygen and of water vapour less than or equal to 1 cc/m$^2$/d.

Measurements of permeability to oxygen are carried out according to standard ASTM F-1927 "Standard Test Method for Determination of Oxygen Gas Transmission Rate, Permeance at Controlled Relative Humidity through Barrier Materials using a Coulometric Detector"; the results are expressed in cc/m$^2$/d (cubic centimetre per square metre per day). Measurements of permeability to water vapour are carried out according to standard ASTM F-1249 "Standard Test Method for Water Vapor Transmission Rate through Plastic Film and Sheeting using a Modulated Infrared Sensor"; the results are expressed in mg/m$^2$/d (milligram per square metre per day).

Barrier properties are observed in particular for metallized films. This is not a necessary property in the case of printable or adhesive films.

Moreover, the composite material obtained may advantageously have properties of adhesion of the coating that are as good, or even better than in the prior art, under wet conditions as well as under dry conditions.

Under dry conditions, the adhesion of the coating may advantageously be at least 1000 gF/38 mm. Under wet conditions, the adhesion of the coating may advantageously be at least 200 gF/38 mm. In general, adhesion of the coating under wet and dry conditions may advantageously be at least 500 gF/38 mm. The adhesion properties are measured according to the adhesion test AT.

The adhesion test AT is carried out according to the recommendations of AIMCAL TP-105-92 (Metallizing Technical Reference published by the Association of Industrial Metallizers, Coaters and Laminators). It is described for metals but it is suitable for other types of coating. The test AT makes it possible to measure the adhesion strength between the metal and PET using a dynamometer. This test is carried out under dry conditions and under wet conditions. The metallized substrate, preferably a metallized PET film, is sealed with a treated polyethylene film (DAP). A test specimen with a width of 38 mm is then cut from the sample and will be used for the measurement. The test specimen is tensile-tested using an INSTRON dynamometer in order to determine the force that has to be applied to pull the layer of aluminium from the coated film. The substrate is fixed in the lower jaws and the DAP film in the upper jaws. In this way, tension is exerted at 180° at a rate of 100 mm/min on the sealed zone and the force required for delamination is measured (standard followed NF T 54-122, "Evaluation de la qualité d'une soudure ou d'un collage de deux éléments de feuilles par un essai de traction" [Evaluation of the quality of welding or gluing of two sheet elements by a tensile test]). The result of this test AT is an adhesion strength expressed in gF/38 mm. For each sample, a minimum of 3 test specimens are tested in this way, and each film is cut into six wide strips, the optical density of which is measured in order to ascertain the quantity of metal deposited. The dynamometer force required to pull the layer of metal from the PET film is measured under dry conditions and under wet conditions. For measurement in a humid environment, the operator applies a small quantity of water to simulate a moisture-laden environment.

The applications of the composite materials according to the present invention are in particular food packaging, medical packaging, printable films, decoration or protection of substrates and so-called industrial applications, for example electrical insulation, electronic components, protective films, optical films, films that filter part of the light spectrum, and films for agriculture or building.

As regards packaging, it may be the packaging of food products from their site of manufacture or production to their arrival at the final consumer. These films are developed quite especially for providing a barrier either to gases (oxygen, nitrogen, helium, water vapour, etc.) or to aromas. It may also be a packaging film for cooking foodstuffs in a microwave oven. The food packaging may be carried out when hot. The barrier properties of the materials used, but also the maintenance of these properties even under conditions of high temperature and under humid conditions are therefore important.

It may also be packaging for protecting various industrial products such as domestic electrical appliances, electronic components, or in the building sector for thermal insulation and protection against moisture.

In the case of decoration, these films are used for creating surfaces of the simulated wood type, for example.

As regards films or sheets for graphic art, they may be printable substrates, covered or not covered with inks.

EXAMPLES

Example 1: Improvement of the Barrier Performance of Latex B by Increasing the Proportion of Cross-Linking Agent An acrylic and/or methacrylic polymer marketed under the name BT-67 by the company DSM was used. It is in the form of particles the average diameter of which is less than 100 nm, dispersed in water (0-15 or 20% of dry extract). This polymer is denoted "Latex B" hereinafter.

The cross-linking agent used is Cymel 303 LF, called "Cross-linking Agent X" below.

Four coating compositions F1, F2, F3 and F4 were prepared:
F1: Latex B only
F2: Latex B+Cross-linking Agent X–Latex/cross-linking agent weight ratio of 80/20 (dry extract/dry extract).

F3: Latex B+Cross-linking Agent X–Latex/cross-linking agent weight ratio of 75/25 (dry extract/dry extract).

F4: Latex B+Cross-linking Agent X–Latex/cross-linking agent weight ratio of 70/30 (dry extract/dry extract).

Figure 1:
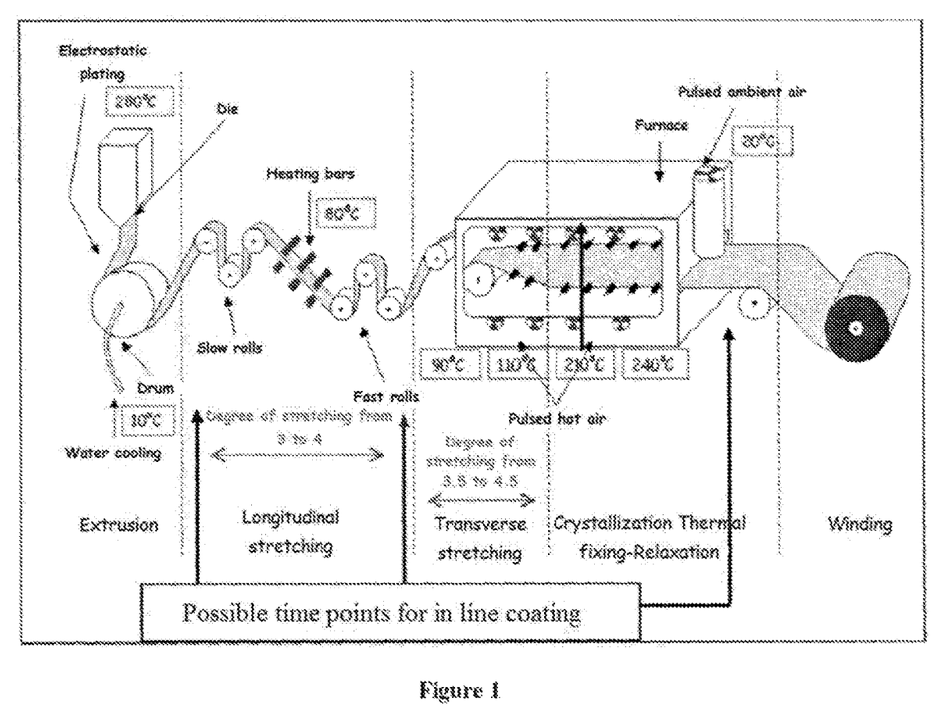
FIG. 1 is a diagrammatic representation of an in-line embodiment of the coating process according to the invention.

These compositions were deposited on a PET film by a coating process in a gravure printing line according to FIG. 1 (Toray Film Europe pilot machine). The rotating gravure roll entrains the coating composition onto the PET film. Small or large gravure rolls may be used for coating in line. The coating composition was dried with infrared radiation at a wavelength of the order of 2 μm.

The PET film coated with a layer of bonding primer was then coated with a layer of aluminium obtained by vacuum evaporation (at $4\times10^{-4}$ mbar) in a conventional industrial metallizing process (TopMet machine from Applied Materials). During metallizing, the thickness of the layer of metal was monitored by measuring the transparency of the film translated into terms of optical density (OD). The OD is comprised between 2.4 and 3.0, which corresponds to a thickness of the metal layer from 30 to 60 nm.

The adhesion properties of the aluminium metal coating under dry conditions and under wet conditions, and the oxygen transmission rate ($PO_2$) of the material obtained were evaluated as was described above and the results are given in Table 1.

TABLE 1

|    | $PO_2$ (cm³/m²/D) | Metal adhesion, dry (gF/38 mm) | Metal adhesion, wet (gF/38 mm) |
|----|-------------------|--------------------------------|--------------------------------|
| F1 | 4.66              | 60                             | 4                              |
| F2 | 3.07              | 1500                           | 200                            |
| F3 | 1.84              | >1500                          | 200                            |
| F4 | 1.76              | >1500                          | 360                            |

It should be noted that increasing the concentration of cross-linking agent tends to improve the barrier level of the material. However, even at high concentration, the oxygen transmission rate remains well above 1 cm³/m²/D.

Example 2: Improvement of Barrier Performance by Adding a Water-Soluble Polyester with Sulphonyloxy Groups A water-soluble polyester bearing sulphonyloxy groups of the following formula was added to the preceding compositions:

in which X has a value of 20. This polymer is denoted "PES" hereinafter.

Six coating compositions F5 to F10 were prepared:

F5: Latex B
+Cross-linking Agent X–Latex/cross-linking agent weight ratio of 80/20 (dry extract/dry extract)

+5% of PES in dry weight, relative to the dry weight of Latex B

F6: Latex B
+Cross-linking Agent X–Latex/cross-linking agent weight ratio of 80/20 (dry extract/dry extract)
+10% of PES in dry weight, relative to the dry weight of Latex B F7: Latex B
+Cross-linking Agent X–Latex/cross-linking agent weight ratio of 75/25 (dry extract/dry extract)
+5% of PES in dry weight, relative to the dry weight of Latex B F8: Latex B
+Cross-linking Agent X–Latex/cross-linking agent weight ratio of 75/25 (dry extract/dry extract)
+10% of PES in dry weight, relative to the dry weight of Latex B F9: Latex B
+Cross-linking Agent X–Latex/cross-linking agent weight ratio of 70/30 (dry extract/dry extract)
+5% of PES in dry weight, relative to the dry weight of Latex B F10: Latex B
+Cross-linking Agent X–Latex/cross-linking agent weight ratio of 70/30 (dry extract/dry extract)
+10% of PES in dry weight, relative to the dry weight of Latex B These compositions were used as described in Example 1 and the properties of the materials obtained were measured in the same way. The results are given in Table 2.

TABLE 2

|  | $PO_2$ (cm³/m²/D) | Metal adhesion, dry (gF/38 mm) | Metal adhesion, wet (gF/38 mm) |
|---|---|---|---|
| Latex B/Cross-linking Agent X (80/20) with and without PES | | | |
| F2 | 3.07 | 1500 | 200 |
| F5 | 0.70 | 1020 | 130 |
| F6 | 0.86 | >1500 | 1400 |
| Latex B/Cross-linking Agent X (75/25) with and without PES | | | |
| F3 | 1.84 | >1500 | 200 |
| F7 | 2.07 | 720 | 100 |
| F8 | 1.92 | 1010 | 60 |
| Latex B/Cross-linking Agent X (70/30) with and without PES | | | |
| F4 | 1.76 | >1500 | 360 |
| F9 | 2.42 | 1400 | 150 |
| F10 | 2.58 | 700 | 70 |

Quite surprisingly, the addition of the polyester with sulphonyloxy groups to the formulation Latex B/Cross-linking Agent X (80/20) made it possible to obtain a material of which the barrier to oxygen reaches significantly low levels, $PO_2$ being less than 1 cm³/m²/d. Moreover, this addition did not have a negative impact on the adhesion strengths between the PET substrate and the metallic coating. On the contrary, the adhesion under moist conditions was particularly reinforced on adding 10% of PES.

The invention claimed is:

1. Coating composition comprising:
   at least one acrylic and/or methacrylic polymer in the form of an already cross-linked latex having a gel content of at least 50% by weight, relative to the total weight of acrylic and/or methacrylic polymer;
   at least one cross-linking agent;
   at least one water-soluble or water-dispersible polyester with sulphonyloxy groups having a content between more than 5% and less than 15% by weight relative to the dry weight of acrylic and/or methacrylic polymer, wherein a weight ratio of acrylic and/or methacrylic polymer relative to the cross-linking agent is greater than 75/25 to about 90/10, and, wherein the cross-linking agent is added to the already cross-linked acrylic and/or methacrylic polymer to allow interfacial cross-linking between the acrylic and/or methacrylic polymer and the cross-linking agent so as to form particles of acrylic and/or methacrylic polymer and cross-linking agent.

2. Coating composition according to claim 1, wherein the acrylic and/or methacrylic polymer is in the form of polymer particles dispersed in an aqueous phase.

3. Coating composition according to claim 1, wherein the cross-linking agent is an amine-based resin.

4. Coating composition according to claim 1, wherein the weight ratio of acrylic and/or methacrylic polymer relative to the cross-linking agent is between about 85/15 and about 80/20.

5. Coating composition according to claim 1, wherein the content of water-soluble or water-dispersible polyester with sulphonyloxy groups is between 8 and 12% by weight relative to the dry weight of acrylic and/or methacrylic polymer.

6. Process for coating a substrate with at least one layer of bonding primer, wherein the following steps are implemented:
   a) a substrate is implemented;
   b) optionally, a physical surface treatment of said substrate is carried out;
   c) at least one face of said substrate is coated with the coating composition as defined in claim 1; and
   d) the coating is cross-linked to obtain a priming coat, the residual level of free acid functions at the surface of the priming coat being at least 5% by weight, relative to the total weight of polymer contained in the priming coat.

7. Coating process according to claim 6, wherein the substrate is a polyester film.

8. Coating process according to claim 6, wherein the priming coat obtained on the substrate has a thickness E less than or equal to 200 nm.

9. Coating process according to claim 6, wherein coating of the substrate is carried out in line.

10. Preparation process of a composite material comprising applying a coating capable of reacting with the priming coat, on a substrate coated with a priming coat obtained by the process according to claim 6.

11. Preparation process of a composite material according to claim 10, wherein the coating is selected from:
   at least one layer of at least one metal and/or at least one metal oxide,
   at least one layer of ink, and
   at least one layer of adhesive.

12. Composite material obtainable by the process according to claim 10.

13. Composite material according to claim 12, wherein the coating is at least one layer of at least one metal and/or at least one metal oxide and in that it has an oxygen and water vapour transmission rate of less than or equal to 1 cc/m$^2$/d.

14. Composite material according to claim 12, wherein the coating is at least one layer of at least one metal and/or at least one metal oxide and in that the adhesion of the coating under wet and dry conditions is at least 500 gF/38 mm.

15. Composite material according to claim 12, wherein the substrate partly comprises recycled product originating from the substrate itself and/or from the coated substrate and/or from the coated and primed substrate.

16. An article comprising the composite material of claim 12, wherein the article is selected from the group consisting of food and non-food packaging, films or sheets for graphic art, films or sheets for decoration, films or sheets for substrate protection, and films or sheets for thermal insulation and protection against moisture in the building sector.

17. Coating composition according to claim 1, wherein the acrylic and/or methacrylic polymer comprises:
   at least one partially hydrophilic monomer of alkyl acrylate, of alkyl methacrylate or a mixture of the two, the alkyl moiety of these monomers containing 1 or 2 carbon atoms;
   optionally at least one hydrophobic monomer of alkyl acrylate, of alkyl methacrylate or a mixture of the two, the alkyl moiety of these monomers being linear or branched and containing at least 4 carbon atoms; and
   at least one hydrophilic monomer.

18. Coating composition according to claim 1, wherein the acrylic and/or methacrylic polymer comprises:
   at least 30% by weight of partially hydrophilic monomer(s) based on the total weight of monomer selected from methyl acrylate, methyl methacrylate, ethyl acrylate, and mixtures thereof;
   optionally at least one hydrophobic monomer of alkyl acrylate, of alkyl methacrylate or a mixture of the two, the alkyl moiety of these monomers being linear or branched and containing at least 4 carbon atoms; and
   at least 10% by weight of hydrophilic monomer(s) based on the total weight of monomer selected from acrylic acid, methacrylic acid and mixtures thereof.

19. Coating composition according to claim 17, wherein the at least one hydrophobic monomer is present in the acrylic and/or methacrylic polymer.

20. Coating composition according to claim 18, wherein the at least one hydrophobic monomer is present in the acrylic and/or methacrylic polymer in an amount of at least 10% by weight based on the total weight of monomers.

* * * * *